United States Patent
Mart et al.

(10) Patent No.: US 8,473,624 B2
(45) Date of Patent: Jun. 25, 2013

(54) METHOD AND SYSTEM FOR ROUTING TEXT BASED INTERACTIONS

(75) Inventors: Beeri Mart, Hod HaSharon (IL); Moshe Wasserblat, Maccabim (IL); Oren Lewkowicz, Zur Moshe (IL); Hadas Liberman Ben-Ami, Kadima (IL); Omer Gazit, Ramat Hashron (IL); Zohar Tsfoni, Tel-Aviv (IL); Stas Margolis, Alfei Menashe (IL); Ronit Ephrat, Tel-Aviv (IL)

(73) Assignee: Nice Systems Ltd., Raanana (IL)

( * ) Notice: Subject to any disclaimer, the term of this patent is extended or adjusted under 35 U.S.C. 154(b) by 297 days.

(21) Appl. No.: 12/840,777

(22) Filed: Jul. 21, 2010

(65) Prior Publication Data

US 2012/0020473 A1     Jan. 26, 2012

(51) Int. Cl.
*G06F 15/16*     (2006.01)

(52) U.S. Cl.
USPC .......... 709/228; 709/226; 709/227; 709/229; 379/265.01; 379/265.02; 379/265.03; 379/266.04; 379/266.03

(58) Field of Classification Search
USPC ................ 379/265.01–266.03; 709/226–229
See application file for complete search history.

(56) References Cited

U.S. PATENT DOCUMENTS

| | | | |
|---|---|---|---|
| 6,934,381 B1 * | 8/2005 | Klein et al. | 379/265.09 |
| 2004/0158611 A1 * | 8/2004 | Daniell et al. | 709/206 |
| 2006/0233349 A1 * | 10/2006 | Cooper | 379/265.06 |
| 2008/0171549 A1 * | 7/2008 | Hursey et al. | 455/445 |
| 2008/0267384 A1 * | 10/2008 | George | 379/220.01 |
| 2008/0285739 A1 * | 11/2008 | Golitsin et al. | 379/265.09 |
| 2010/0158225 A1 * | 6/2010 | Rogers | 379/142.06 |
| 2010/0183134 A1 * | 7/2010 | Vendrow et al. | 379/201.06 |
| 2011/0069821 A1 * | 3/2011 | Korolev et al. | 379/88.04 |

* cited by examiner

*Primary Examiner* — Joseph J Nguyen
(74) *Attorney, Agent, or Firm* — Pearl Cohen Zedek Latzer, LLP

(57) ABSTRACT

Embodiments of the invention are directed to a system and method for routing interactions. A method may include receiving a message related to the interaction. Text included in the message may be analyzed. A destination may be selected for the message based on analysis of the text. The message may be routed to the selected destination.

12 Claims, 2 Drawing Sheets

METHOD AND SYSTEM FOR ROUTING TEXT BASED INTERACTIONS

BACKGROUND

Contact centers, call centers and/or organizations or businesses utilize various means to interact with clients, customers or other parties. In particular, electronic mail (email) and chat applications are common communication channels in modern contact or call centers. Of great importance to an operation of a contact center is the selection of an agent to handle an incoming call, session or interaction.

For telephone calls, such a selection may be made by simply routing an incoming call based on an availability of an agent, e.g., using switching equipment to switch or connect an incoming call to an agent not currently engaged in another call. The contact center may employ Interactive Voice Response (IVR) or Automated Voice Response (AVR) in order to obtain information from a caller and, based on input from the caller, route the call or session to an agent.

In contrast, in modern contact centers, an agent can interact simultaneously with a number of customers, e.g., by e-mail or electronic chat communication. Accordingly, the availability of an agent may no longer be necessarily determined by simply determining whether the agent is currently hosting another session. Other operational modes and capabilities of modern contact infrastructure may be attributed to the routing capabilities of a packet-switched networks as well as to the capacity of packet switching infrastructure to store and/or process packets and forward them to a destination at a later time and/or forward packets based on processing of the packets.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
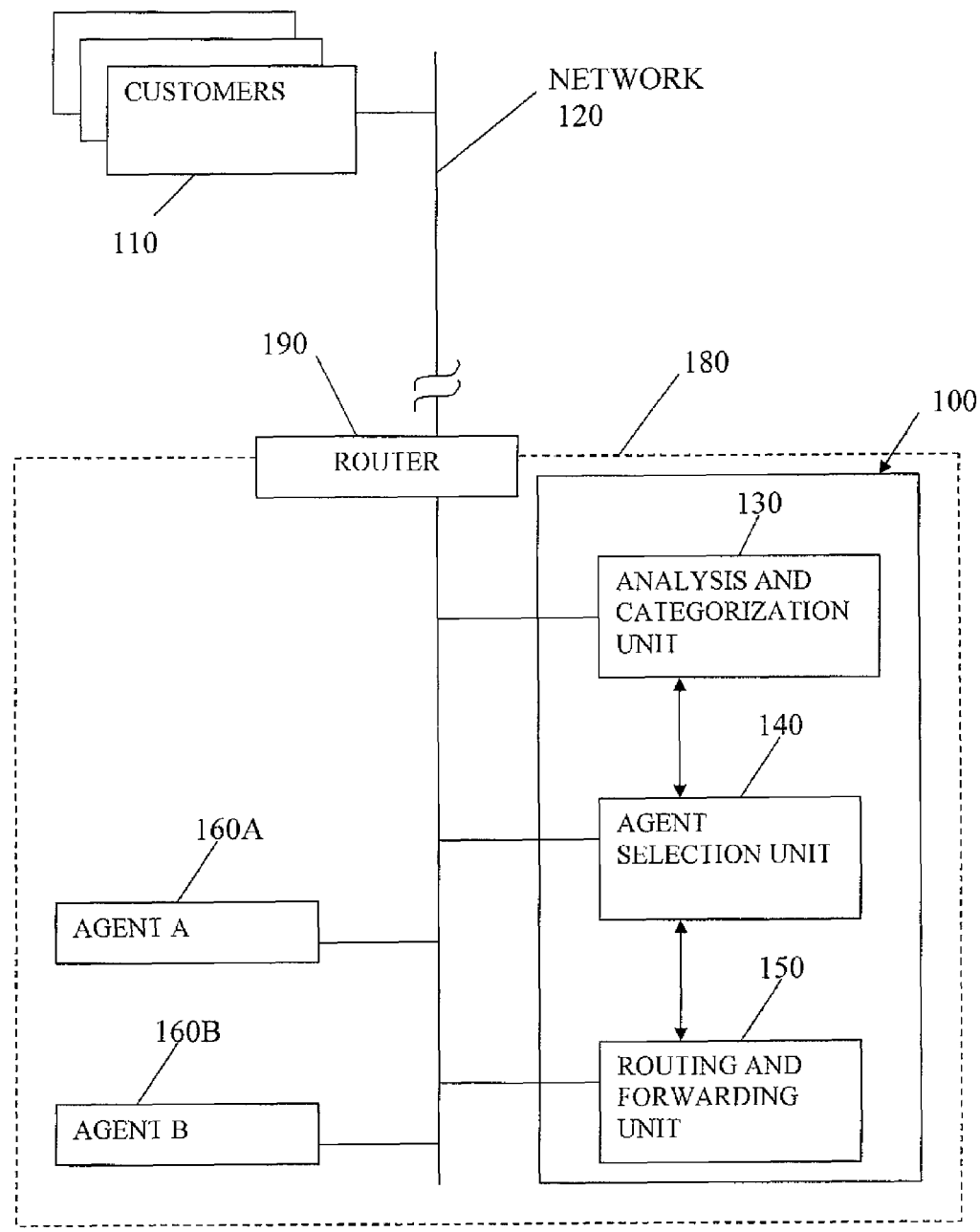
FIG. 1 shows a block diagram of an exemplary system for routing interactions according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF DEMONSTRATIVE EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of devices" may include two or more devices.

Although embodiments of the invention are not limited in this regard, the terms "contact center" and "call center" and "back-office" as used herein may be used throughout the specification and claims to describe any centralized or distributed locations used for collective handling of user interactions and/or other information, for example, telephone calls, faxes, e-mails, internet chat sessions or other web sessions and the like.

Although embodiments of the invention are not limited in this regard, the terms "session" and/or "interaction" as used herein may be used throughout the specification and claims to describe any communication session, e.g., an electronic chat session, an electronic mail (email) session or an instant messaging session. A session may be established between two or more humans, e.g., a customer and an agent in a contact center. A session may involve components, for example, an interaction may involve a device or a component of a recording or routing system. The term "agent" as used herein may refer to any person who is assigned the task of interacting with, hosting or handling sessions with customers, clients or others who may interact with a contact center or a relevant organization, facility, institution or business.

Embodiments of the invention may enable routing of a message or an interaction to an agent based on parameters, aspects and processing related to the content of the interaction. In addition, routing and/or forwarding of a message or an interaction as described herein may be performed in real time. In a particular, electronic chat and email interactions may be routed as described herein. Electronic chat or instant messaging applications and/or platforms, e.g., Microsoft® Instant Messenger, have become a common tool for interacting with contact centers. As described herein, embodiments of the invention may be particularly applicable to such text based interactions. However, although for the sake of simplicity and clarity, electronic chat interactions will mainly be referred to herein, it will be understood that any applicable interactions using any applicable technology or application may be relevant. For example, short message service (SMS) over mobile phones or computers as known in the art may be similarly used in conjunction with embodiments of the invention. In other embodiments, social network related platforms and/or applications may be used. For example, as known in the art, various social networks platforms may enable users to communicate or exchange text. Accordingly, a customer may interact with an agent in a contact center using Twitter© or from within a Facebook© account or using any applicable social network related application. In some embodiments, where text analysis is used, non-textual content of an interaction (e.g., voice) may be first converted to text (e.g., using speech-to-text technology). Accordingly, a variety of forms or types of interactions may be used in conjunction with embodiments of the invention.

According to embodiments of the invention, a message related to an interaction may be received, e.g., at an entry point of a call center. For example, a customer whishing to interact with a call center may use a chat application to send a text message to the call center. Such message may be received by a controller upon arriving at the call center. Rather than simply routing the message to a next available agent in the call center as may be done by prior art systems, the controller (possibly aided by additional controllers or devices) may analyze text contained in the received message and select one or more destinations for the message based on text analysis of text included in the message. As described herein, a number of controllers, units or modules may perform the tasks of receiving a message, analyzing text in the message, selecting one or more destinations for the message and/or the related interaction, and routing or forwarding the message or interaction to the one or more selected destinations.

A destination selected may be an agent who is best suited to interact with the customer. For example and as further described herein, based on analysis of text in a message, possibly in conjunction with analysis of related metadata, a message or interaction may be classified, categorized and/or matched with a predefined category. As further described, a category of interactions may be associated with one or more agents who may have skills which are specifically relevant to the category. Accordingly, an agent to host an interaction may be selected by matching a result of a message's analysis with a category and based on the category, selecting an agent, e.g., an agent associated with the category.

Embodiments of the invention are not limited to selecting a single destination for a message or interaction. For example, based on analysis of the content of a message (e.g., text analysis), a message or interaction may be classified or categorized and may further be routed or forwarded to a number of destinations. For example, based on the content and/or metadata of an incoming message, the message may be forwarded to an agent who will interact with the customer, and, in addition, to a back-office application or personnel or to an administrator and/or customer service department and/or a logging system etc. Accordingly, routing of messages or interactions based on their content may be to a plurality of selected destinations based on the content and/or metadata of the messages or interactions.

An important aspect of embodiments of the invention may be the real-time processing, analysis and routing or forwarding of messages. Unlike prior art systems that may store messages (e.g., mail messages), process stored messages in off-line mode and further forward the stored messages, embodiments of the invention may perform the tasks of receiving a message, analyzing text therein, categorizing the message or related interaction, selecting a destination and forwarding the message to the selected destination in real-time. Accordingly, a client initiating a text based or other session with a contact center may not notice any delay in the establishment of the session that may be routed to the best suited agent as described herein.

Reference is made to FIG. 1, showing a block diagram of an exemplary system 100 for routing interactions according to embodiments of the present invention. It will be understood to a person skilled in the art that the architecture and components of exemplary system 100 described herein do not limit the scope of the invention and embodiments of the invention may be implemented by other systems or components.

As shown, system 100 may be connected to a router 190, one or more customers (and associated devices) 110 and agents (and devices) 160A and 160B. For the sake of simplicity, customers 110 and agents 160A/B and their associated devices are shown together. It will be understood that where customers 110 or agents 160A/B are referred to herein, their associated devices are likewise referred to as or when applicable. Customers 110 may use any suitable communication device in order to establish and maintain a session or interaction with agents 160A/B. For example, devices used by customers 110 may be a mobile and/or cellular phone, a computer, a smartphone, a laptop or a personal digital assistant (PDA). Agents 160A/B may use any suitable device, e.g., a telephone, a computer and/or any other equipment used by, for example, agents in a call center or back-office as known in the art. Router 190 may be an entry point into a contact center (e.g., contact center 180 described below), may receive some or all network traffic destined to the contact center and may selectively, e.g., based on dynamic configuration parameters route packets, messages or other network traffic between system 100, agents 160A/B and customers 110.

As shown, system 100 may comprise an analysis and categorization unit 130, an agent selection unit 140 and a routing and forwarding unit 150. Analysis and categorization unit 130 may be configured to receive a message or content of a message and analyze the message's content. For example, analysis and categorization unit 130 may be configured to perform text analysis of provided text and further provide results of such analysis. Agent selection unit 140 may be configured to receive analysis results (e.g., from analysis and categorization unit 130 as shown by the double headed arrow connecting blocks 130 and 140) and to select an agent by relating analysis results to a set of parameters. For example, based on analysis of text in a message, analysis and categorization unit 130 may provide one or more parameters, values or other information categorizing the message or otherwise indicating attributes of the message or the message's content.

Provided with such data, agent selection unit 140 may select an agent to handle and/or receive the message by relating analysis results to a list of agents. Agent selection unit 140 may select an agent by determining a match between one or more message analysis results and one or more parameters associated with an agent. An output of agent selection unit 140 may be a message identifier or the message itself and an agent identifier. Output of agent selection unit 140 may be provided to routing and forwarding unit 150 (e.g., over network 120 or directly as shown by the double headed arrow connecting blocks 140 and 150). Provided with a message or a reference to a message and an agent identifier or reference, routing and forwarding unit 150 may route and/or forward the message to the selected agent, e.g., to a device associated with the agent.

Dashed line 180 may schematically denote a contact or call center, a back-office system or any other relevant facility or location. As shown by the dashed line 180, routing and forwarding unit 150, agent selection unit 140, analysis and categorization unit 130 and agents 160A/B may be located within the relevant facility. It will be noted that although location of units 130, 140 and 150 inside a relevant facility (e.g., a call center) is a typical scenario or case, embodiments of the invention are not limited by such arrangement. Although typically the shown units are located within a contact center there may be cases where, for example, analysis and categorization unit 130 may be located elsewhere and may, over network 120, provide its output (e.g., analysis results) to units located inside a call center. Likewise, in some embodiments, a number of routing and forwarding units 150 may be employed. For example, a first forwarding unit 150 in a first contact center may forward a message and a selected agent to a second forwarding unit 150 in a second contact center and the second forwarding unit 150 may forward the message to an agent in the second contact center.

It will be understood that units shown in system 100 and described herein relate to one exemplary implementation and that other implementations are possible. For example, in another implementation, functionality of units 130, 140 and 150 as described herein may be distributed over a larger number of units or modules or combined, e.g., into a single module, e.g., a software module executed on a computing device connected to network 120. According to embodiments of the invention, units 130, 140 and 150 may be or comprise software, hardware, firmware or any combination thereof. For example, routing and forwarding unit 150 may be a dedicated network appliance comprising routing circuitry and firmware as known in the art, agent selection unit 140 may be a software module executed on a computer operatively connected to a storage that stores agent lists, categorizing parameters and other parameters and analysis and categorization unit 130 may be a dedicated hardware specifically tailored to perform heavy tasks such as text analysis, in real-time.

An interaction as referred to herein may be defined based on a variety and/or number of parameters, indications. According to embodiments of the invention, configuration or other parameters may determine rules, thresholds, criteria or context that may be used to define or identify as well as setup an interaction. For example, in one embodiment or scenario, routing and forwarding unit 150 may be configured as the default router for agent devices, accordingly, as known in the art, by maintaining a list of associated nodes, unit 150 may route messages originating at agent devices to the proper destination (e.g., the customer devices) and further route messages coming from customer devices to the agent associated with the interaction. In another embodiment, once an interaction has been defined, e.g., devices participating in the interaction and related parameters, e.g., internet protocol (IP) addresses and ports determined, unit 150 may configure a router (e.g., router 190) on network 120 to route messages related to the interaction. Accordingly, in some embodiments, once an agent was selected (e.g., based on analysis of message content as described herein) and an interaction is defined, setup and/or established, some or all of units 130, 140 and 150 may not participate in the interaction. Such configuration may be desirable in order to increase efficiency and performance.

In yet another embodiment, some or all of units 130, 140 and 150 may be involved in an interaction during some or all the time period of the interaction. For example, analysis of messages may be performed for messages other than the first message in an interaction. As described herein, one of the purposes for analyzing a message from a customer is to select an agent to interact with the customer. Accordingly, in order to serve such purpose, a single, first message may be analyzed and an agent may be selected. In some cases however, analysis of a first message may not suffice in order to determine which agent or category of agents is best suited to interact with the customer. Accordingly, a second message may be analyzed in order to select an agent or category of agents best suited to interact with the customer. For example, upon receiving analysis results, agent selection unit 140 may determine the results are insufficient in order to select an agent, may interact with analysis and categorization unit 130 and may request further analysis of subsequent messages. A configuration parameter that may be, for example, a time limit or a maximum packets number may determine how long agent selection unit 140 will delay an agent selection (e.g., due to insufficient analysis results) and will further perform a predefined selection, e.g., selecting a default agent.

According to embodiments of the invention, selecting a destination may be a dynamic and/or continuous process. For example, analysis and categorization unit 130 may analyze some or all messages related to an interaction and may continuously provide agent selection unit 130 with analysis results. Agent selection unit 130 may select a destination (e.g., an agent) for messages during a first part of the interaction but may further, based on further analysis results, select a different or an additional destination. For example, based on possibly continuous text analysis of messages related to an interaction, it may be determined that a customer is not satisfied with the service. Analysis results reflecting such dissatisfaction may be provided to agent selection unit 130 that may, in response, select an administrator as an additional destination for messages from the customer and/or the agent. Accordingly, the list of parties to an interaction may be dynamic and may be determined based on analysis of content received and transmitted by parties to the interaction, session or call.

Another example of dynamic agent selection may be selecting a first agent as described herein, e.g., based on one or more messages received from a client during an initial phase of an interaction, analyzing subsequent messages and, based on analysis of the subsequent messages determining that a second agent is better suited to interact with the client. For example, a specific first agent (e.g., agent 160A) may be selected to interact with a client interested in a specific first product. However, after discussing the specific first product, the client may wish to discuss a second, different product. By continuously analyzing text in messages from the client and determining a best agent to handle the interaction, embodiments of the invention may select a second agent (e.g., agent 160B) that may be better suited to discuss the second product with the client and accordingly, cease routing messages from the client to the first agent and commence routing messages from the client to the second agent. In the case of text base interactions such as internet chat, instant messaging or SMS, replacing agents while a session is in progress may be performed seamlessly, without the customer being aware that he or she is actually interacting with a first agent during a first period of time and with a second agent during a second period of time. For example, by providing any agent who is made part of an interaction with any text or other data exchanged in the interaction, e.g., from the point of establishment, an agent may be able to participate in an interaction even if he or she was not part of the interaction during previous stages or times. For example, a first agent may interact with a customer using an internet chat application during a first period of time after which system 100 may determine that a second agent is better suited to handle the interaction. In such case, the second agent may be provided with some or all text exchanged between the first agent and the customer thus, the second agent may effectively interact with the customer.

By dynamically and/or continuously selecting an agent to interact with a customer, embodiments of the invention may enable a call center to provide the best possible service by having the best suited agent for the task interact with a customer at any point during a customer's interaction with a call center.

Network 120 may be, may comprise or may be part of a private or public IP network, e.g., the internet. Network 120 may also or in addition, be, comprise or be part of a global system for mobile communications (GSM) network. For example, network 120 may include or comprise an IP network such as the internet, a GSM related network and any equipment for bridging or otherwise connecting such networks as known in the art. In addition, network 120 may be, may comprise or be part of an integrated services digital network (ISDN), a public switched telephone network (PSTN), a public or private data network, a local area network (LAN), any combination of the preceding and/or any other suitable communication means. It will be recognized that embodiments of the invention are not limited by the nature of network 120. Accordingly, network 120 may enable customers 110 (who may use computers, mobile phones or other communication equipment) to interact with agents 160A/B or any component of system 100 or call center 180. Network 120 may connect devices located inside call center 180 with devices located outside the call center. For example and as shown by the dashed line 180, agents 160A/B and their associated devices, analysis and categorization unit 130, agent selection unit 140 and routing and forwarding unit 150 may be located within a call center. As further shown, network 120 may connect components or devices located inside call center 180 with devices located outside call center 180, e.g., customer devices 110.

According to some embodiments of the invention, routing messages or interactions as described herein may be done based, at least in part, on predefined interaction categories and associated rules, thresholds or criteria. For example, an employee may replay recorded interactions, identify various parameters or identifiers and produce a list of categories, associated identifiers and associated rules that may be used by analysis and categorization unit 130, agent selection unit 140 or other components of system 100. For example, recorded chat interactions may be examined and specific features, e.g., keywords, phrases, key-phrases or sentence boundaries may be identified therein. In case of voice calls, in addition to features relevant to text base interaction such as keywords, talk-analysis (that may be performed by automated and/or computerized means or by a human) may be employed. For example, a level of annoyance, antagonism or resentment of a customer may be identified or determined and may be used to categorize an interaction. In some embodiments, speech-to-text may be employed in order to transform voice data of a voice call to text and the resulting text may then be analyzed as described herein. However, features that are unique to voice (e.g., those determined by talk analysis as known in the art) may be used in conjunction with text analysis in order to route interactions as described herein.

Specific features (such as keyword or phrases) may further be associated with a category. For example, "customer churn" as known in the art relates to customers' dissatisfaction and potential migrating to another service provider or vendor. Accordingly, a "customer churn" category may be defined. An employee may examine (e.g., by replaying) a large number of chat interactions and may further identify specific features that appear frequently in these chat interactions. For example, it may be found that phrases such as "cancel my account" and "unhappy with the service" appear in a large number of chat interactions that are "customer churn" ones. Accordingly, a defined "customer churn" category may be associated with these specific features. Various logical rules may be associated with a category and its features. For example, a logical rule may define the order and/or frequency of appearance of features, or a logical rule may define a time interval between appearance of a first feature and a second feature or define that two or more features can not appear in the same interaction etc. Any logical rule relating to any feature may be defined and used in order to classify or categorize interactions. Accordingly, any category of interactions may be defined as well as any associated features and/or logical or other rules.

For example, a category and associated features and rules may be related to the customer, e.g., age, gender, education, geographical residence location etc. For example, a set of features comprising slang phrases used by teenagers and rules related to the way such slang is typically used may be identified as described herein and may be used in order to categorize an interaction as "young customer". Another set of features and rules may be identified in order to identify a product or a product family. Other exemplary categories may be "fraud" that may be a category of interaction that are suspected as fraud, crank calls or a hoax. Any other applicable aspects may be used to define any applicable category, e.g., a time of day, a day in a week, a type of interaction, e.g., one of a voice call, an e-mail, a chat, etc. Metadata such as language, IP address of customer and the like may likewise be used to define a category. It will be understood that features and rules for defining and/or identifying a category of interactions described herein are exemplary and that any applicable information, data or parameters may be used to define and/or identify a category of interactions by embodiments of the invention. A default category may be defined to be the category of an interaction for which no category was found or matched. Accordingly and as described herein, routing of an interaction for which no category was successfully determined may be to one of the agents associated with the default category.

According to some embodiments of the invention, categories may be associated with agents in a call center. Association of categories with agents may be based on any applicable criteria or logic as well as work force management considerations or any other considerations. For example, it may be decided that agent 160A is to handle "customer churn" interactions and agent 160B is to handle interactions where the customer is a child or young adult, accordingly, agent 160A may be associated with the "customer churn" category and agent 160B may be associated with the "young customer" category. A list of categories, associated features, associated rules and associated agents may be provided to system 100 and may be used for routing interactions to agents as described herein. For example, analysis and categorization unit 130 may be provided with feature sets related to respective categories and may identify such features, their rate of recurrence or other related aspects in processed or analyzed text. Based on identified or detected features in analyzed text and/or based on rules associated with such features, analysis and categorization unit 130 or agent selection unit 140 may determine a match level between an interaction and a category. For example, a match level of eighty percent (80%) between an interaction and a predefined category may be determined based on analysis results of text related to the interaction, a set of associated logical rules, and an algorithm that relates the analysis results with a predefined criteria or set of rules that enable relating analysis results to a category, thus determining a match level. In an exemplary embodiment, agent selection unit 140 may be provided with categories and respectively associated agents. Once an interaction has been categorized (e.g., associated with a category with a match level that is above a predefined level or threshold), agent selection unit 140 may be provided with a reference to the category of the interaction and may select one of the agents associated with the category to handle the interaction.

In some embodiments, in addition to, or instead of, manually categorizing interactions, determining features and associated rules, the process may be automated. an automated process may generate a model that may be used in order to categorize an interaction. For example, a set of interactions identified as "customer churn" interactions may be provided to such automated or computerized process. Features may be identified or extracted from the provided interactions using methods and techniques known in the art, e.g., part-of-speech tagging (POS tagging or POST), sentence boundary identification or computerized talk-analysis. The identified and/or extracted features may be used to automatically generate interaction category models. For example, models may be generated using known in the art statistical methods e.g., the generalized method of moments (GMM) and/or the hidden markov model (HMM). In other embodiments, discriminative models may be generated by defining a multi-dimensional linear separation surface that may be used in order to determine whether an interaction matches a predefined model e.g., by determining to which side of a surface an interaction is mapped. For example, methods like support vector machines (SVM) or neural network related methods may be used to generate such discriminative models. In yet other embodiments, natural language processing (NLP) techniques may be used to generate a model comprising logic rule patterns and/or decision tree as known in the art.

Provided with a set of features extracted from an interaction (e.g., using text analysis), a model (or set of models) generated as described herein may determine and provide a matching or relevance score, or a probability of the interaction being relevant to a specific category. For example, a set of features extracted from an interaction's text (e.g., keywords) may be provided to a set of models that may each, when executed, return a score or value reflecting a relevance or a match of the interaction with a respective category. For example, provided with one or more features extracted from an interaction, a set of models employed as described herein may indicate that the probability that the interaction is a "customer churn" interaction is sixty seven percent (67%), the probability the interaction is a "Fraud" interaction is ninety seven percent (97%) and the probability the interaction is a "Purchase an electric appliance" interaction is thirty percent (34%).

A threshold parameter may be defined for some or all categories, such threshold may be used to increase the dependability of the categorization by only associating an interaction with a category if the probability of the interaction being relevant to the category is above the threshold. For example, it may be defined that an interaction is to be categorized as a "Fraud" interaction only if the probability of it being a fraudulent interaction ("Fraud") is higher than eighty five percent (85%). In addition, there may be cases where a number of different models indicate or determine the interaction is to be associated with a number of different categories. For example, a set of models provided with features extracted from an interaction's text may indicate the interaction has a probability of eighty six percent (86%) of being a "Fraud" and a probability of sixty six percent (66%) of being a "Complaint" interaction. Accordingly, a normalizing process may be executed whereby scores or probabilities produced by a number models are first normalized according to predefined rules and then compared. In a typical embodiment, the category associated with the highest score is the one selected. As described herein, once a category of an interaction has been determined, a list of agents associated with the category may be examined and an agent may be selected, possibly based on predefined logic and the interaction may then be routed to the selected agent.

Some exemplary scenarios of categorizing an interaction based on text or other analysis and selecting a destination based on such categorizing may be, for example, reception of an email, determining by text analysis (e.g., by analysis and categorization unit 130) the email is in German, categorizing the mail interaction as "Foreign language" and further associating a parameter identifying the foreign language as "German" with the email, selecting (e.g., by agent selection unit 130) an agent associated with the "Foreign language" category and further identified as speaking German, and routing the email to the selected agent. It will be noted that processing emails or chat messages as described herein may be done on-the-fly or in real-time so response to a client may be provided quickly. For example, other than buffering a message while it is processed, analysis and categorization unit 130, agent selection unit 130 and routing and forwarding unit 150 may use no long term storage, namely, they may operate in real-time, possibly delaying messages for durations of milliseconds only. In another scenario, analysis of an email message reveals the customer has a technical problem with a specific product. Text analysis of text in the email further determines the customer's satisfaction score is very low. The analysis results are provided to a set of models which, when executed return an association of the email with a first category related to the specific product and a second category related to customer relations. Based on the determined categories, a destination selection is made resulting in forwarding the email to an agent who specializes in the specific product and to a retention team. In another case, a customer initiates an internet chat session with a contact center and asks a question regarding sound equipment, text analysis of the text received from the customer categorizes the interaction as "Sound equipment" and agent selection then selects an agent associated with that category. Text analysis of text received from customers may indicate a possibility of up-selling as known in the art. For example, by identifying products a customer purchased, date purchased and the like a chance of making an up-sell may be identified. Analysis results may reflect such opportunity and may associate a session with a category of "Up-sell". Sessions categorized as may be routed to an agent who specializes in up-selling and/or in the product that may be sold b an up-sell. Similarly, sessions suspected as being related to fraud (e.g., by identifying features typical to fraudulent sessions in the session's text) may be routed to a team or agent specializing in fraudulent activities. In some embodiments, possibly in addition to categorizing an interaction or message as described herein, and interaction may be categorized based on historical data. For example, any information, parameters or data related to past or previous interactions with a customer may be stored, retrieved and used to categorize an interaction. For example, categories with which a customer was associated in the past may be recorded and used in the process of categorizing an interaction, e.g., a previous category may be the default category for a client. In addition, parameters computed or extracted from past interaction of a customer may be used to categorize an interaction as described herein.

Figure 2:
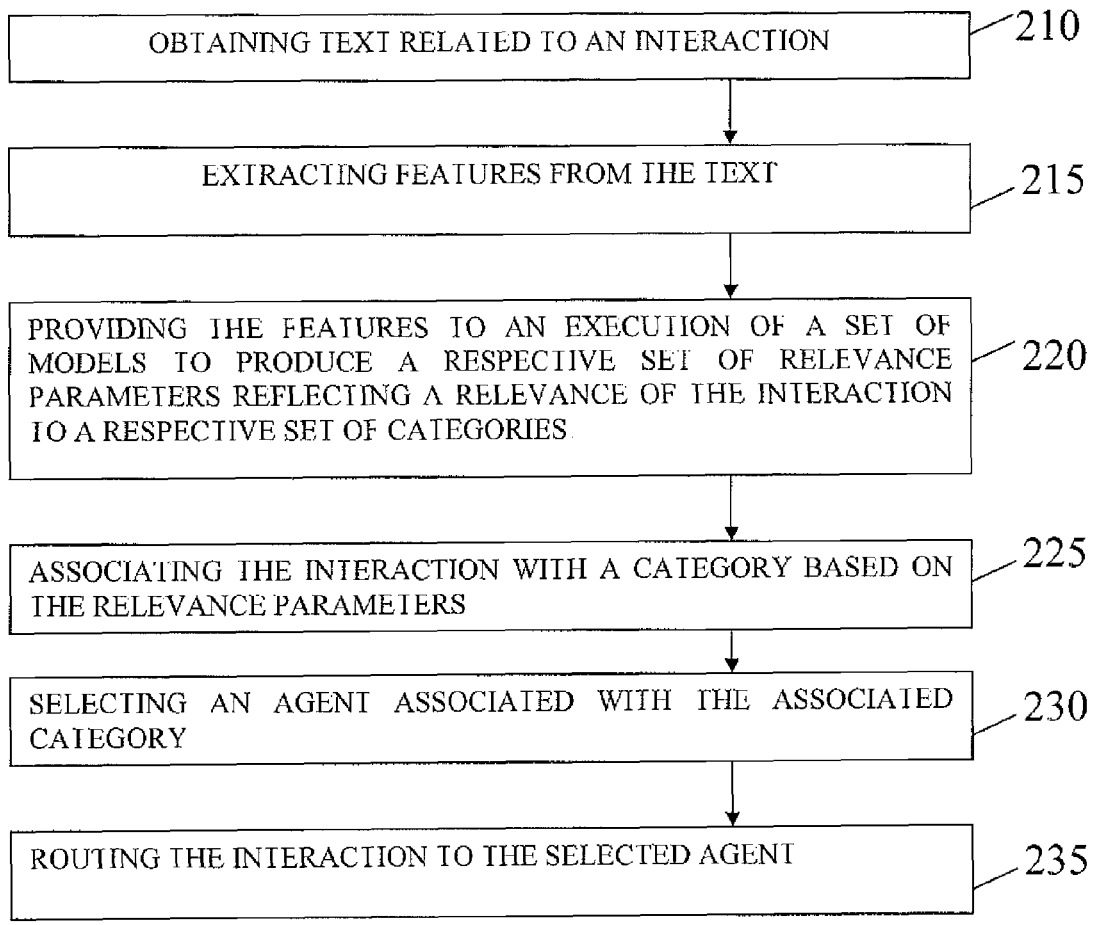
FIG. 2 shows an exemplary flowchart that may be used to implement embodiments of the invention.

Reference is made to FIG. 2 which is an exemplary flowchart describing a method according to embodiments of the invention. As shown by block 210, the flow may include obtaining text related to an interaction. As described herein, text related to an interaction may be obtained in any applicable way. For example, a router at a call center may be configured to receive traffic destined to the call center and forward all or selected traffic to analysis and categorization unit 130 for analysis and/or categorization. Prior to analyzing text, received network packets may be processed, e.g., lower layer data may be stripped and/or text may be extracted from network packets. Metadata, e.g., network addresses, time stamps, packet length, packet intervals and the like may be examined and may further be provided to any one of units 130, 140 and 150 to be used in the process of analysis, agent selection and routing. For example, as described herein, the source IP address and port may be provided to routing and forwarding unit 150 so that network devices may be configured by unit 150 such that subsequent packets may bypass some of system 100 components.

As shown by block 215, the flow may include extracting features from the text. As described herein, text analysis of text may comprise extracting features such as keywords, phrases etc. As shown by block 220, the flow may include providing the features to an execution of a set of models to produce a respective set of relevance parameters reflecting a relevance of the interaction to a respective set of categories. For example, analysis and categorization unit 130 may extract a set of features from text of the interaction and may use such extracted features as input to an execution of a set of models described herein. The execution of the models may produce a set of parameters that may be or may comprise probabilities or relevance values that indicate a level of relevance of the interaction to a category. For example, each model may be associated with a specific category and may, accordingly, produce a probability or relevance value that reflects a match level of the interaction with the associated category.

As shown by block 225, the flow may include associating the interaction with a category based on the relevance parameters. For example, an interaction may be associated with a category only if the relevance parameter produced as described herein is above a predefined threshold. As further described, if a relevance to more than one category is determined, a selection between a number of possible categories may be made. In some embodiments, more than one category may be associated with an interaction and an agent selected may be any one of the agents associated with any one of the associated categories.

Although not shown in FIG. 2, any parameters or information may be used to associate an interaction with a category and/or agent. For example, any historical data or information related to a customer may be used in order to associate an interaction with a category. For example, historical information indicating products the customer purchased in the past, agents the customer interacted with (and respective results of such previous interactions) may all be used to associate an interaction with a category and/or agent. Such historical information may be stored in a contact center as known in the art and may be available to any unit or component of system 100. For example, analysis and categorization unit 130 may retrieve historical data related to a customer based on any applicable parameters as known in the art, e.g., a customer's name, identification code or number, address and the like. Analysis and categorization unit 130 may further use such retrieved historical data to categorize the interaction as described herein.

As shown by block 230, the flow may include selecting an agent associated with the associated category. As described herein, categories may be associated with agents, accordingly, once the category to which the interaction belongs has been determined, the list of agents associated with the category may be examined and an agent may be selected from the list. Agents may be associated with a category based on any applicable parameter, criteria, aspect or consideration. For example, association of agents with a category may be according to their skills, e.g., expertise or knowledge relevant to a specific product, a capability to handle or interact with angry customers etc. Other aspects that may influence association of agents with a category may be load (e.g., average number of interactions related to a specific category) or other work force related considerations. As shown by block 235, the flow may include routing the interaction to the selected agent. Once an agent is selected, traffic related to the interaction, e.g., messages related to an internet chat session may be routed to the selected agent as described herein.

One or more of analysis and categorization unit 130, agent selection 140 and routing and forwarding unit 150 may be, may be part of or may comprise a computing device that may include a controller that may be, for example, a central processing unit processor (CPU), a chip or any suitable computing or computational device. Such computing device may comprise an operating system, a memory, a storage, one or more input or output devices. An operating system included in such computing device may be or may include any code segment designed and/or configured to perform tasks involving coordination, scheduling, arbitration, supervising, controlling or otherwise managing operation of computing device, for example, scheduling execution of programs. Memory in such computing device may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 320 may be or may include a plurality of, possibly different memory units. Executable code that may be an application, a program, a process, a task or a script may be loaded into a memory of the computing device and may be executed by the controller.

Storage in the computing device may be or may include, for example, a hard disk drive, a floppy disk drive, a Compact Disk (CD) drive, a CD-Recordable (CD-R) drive, a universal serial bus (USB) device or other suitable removable and/or fixed storage unit.

Accordingly, embodiments of the invention may include an article such as a computer or processor readable medium, or a computer or processor storage medium, such as for example a memory, a disk drive, or a USB flash memory, encoding, including or storing instructions, e.g., computer-executable instructions such as executable code 325, which when executed by a processor or controller, carry out methods disclosed herein. For example, a storage medium such as memory 320, computer-executable instructions such as executable code 325 and a controller such as controller 305. Some embodiments may be provided in a computer program product that may include a machine-readable medium, stored thereon instructions, which may be used to program a computer, or other programmable devices, to perform methods as disclosed above.

Embodiments of the invention may include, e.g., in one or more of analysis and categorization unit 130, agent selection 140 and routing and forwarding unit 150, components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components. In some embodiments, such system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of routing messages related to a text based interaction, the method comprising:
   receiving a message related to the interaction;
   analyzing text included in the message by extracting features from the text to produce an analysis result, wherein the text is related to the interaction;
   selecting an agent associated with a contact center based on the analysis result; and
   routing the message to the selected agent,
   wherein the analysis result is produced by:
      providing the features to a set of models;
      executing the set of models; and
      producing a set of relevance parameters, wherein the parameters reflect a level of relevance of the interaction to a respective set of categories.

2. The method of claim 1, wherein the interaction is related to one of: an electronic chat application, a short message service (SMS), an electronic mail application and a social network related application.

3. The method of claim 1, comprising configuring a network device to route subsequent messages related to the interaction to the selected agent.

4. The method of claim 1, comprising selecting an additional destination for said message and forwarding said message to said additional destination.

5. The method of claim 1, wherein the analyzing text, selecting a destination and routing the message are performed in real-time.

6. The method of claim 1, comprising receiving metadata and historical data related to the message and selecting a destination based, at least in part, on said metadata and said historical data.

7. The method of claim 1, comprising associating the interaction with a predefined category based on the analysis result and selecting an agent associated with the category to handle the interaction.

8. The method of claim 1, comprising generating a model, wherein the model is used for categorize an interaction.

9. The method of claim 1, comprising associating the interaction with a category if the relevance parameter is above a predefined threshold.

10. The method of claim 1, wherein analyzing the text comprises determining dissatisfaction of a customer and the method further comprising selecting an administrator as an additional destination for the message.

11. The method of claim 10, wherein routing messages from a first agent to a second agent comprises providing the first agent and the second agent with text exchanged during the interaction.

12. The method of claim 1, wherein analyzing the text comprises:
   continuously analyzing text;
   determining a best agent to handle the interaction; and
   routing messages from a first agent to a second agent during the interaction.

* * * * *